United States Patent
Cheng

[11] Patent Number: 5,986,370
[45] Date of Patent: Nov. 16, 1999

[54] AUTONOMOUS GENERATION BRAKE

[76] Inventor: Shui-Jung Cheng, 5F, No. 9, Alley 24, Lane 68, Kwang Fu Rd., Sec. 1, San Chung, Taipei Hsiang, Taiwan

[21] Appl. No.: 09/296,049

[22] Filed: Apr. 21, 1999

[51] Int. Cl.⁶ .................................................. H02K 7/10
[52] U.S. Cl. .......................... 310/77; 310/67 A; 310/112; 310/113; 310/266; 188/164
[58] Field of Search ................................... 310/77, 67 A, 310/112, 113, 114, 103, 266, 67 R; 188/164

[56] References Cited

U.S. PATENT DOCUMENTS

| | | | |
|---|---|---|---|
| 4,532,447 | 7/1985 | Cibie | 310/114 |
| 4,713,567 | 12/1987 | Fey et al. | 310/67 R |
| 5,087,845 | 2/1992 | Behrens et al. | 310/77 |
| 5,404,063 | 4/1995 | Mills | 310/266 |
| 5,444,318 | 8/1995 | Stumpf | 310/77 |
| 5,606,207 | 2/1997 | Gotoh | 310/67 R |
| 5,783,893 | 7/1998 | Dade et al. | 310/266 |

Primary Examiner—Nestor Ramirez
Assistant Examiner—Saeed Ghahramani
Attorney, Agent, or Firm—Pro-Techtor International Services

[57] ABSTRACT

An autonomous generation brake having a dynamo, following rotation of a first rotor of an annular magnet in the core area an even number of armature coil with alternating polarities inside the first stator on the outer periphery are induced to produce an alternate current potential to be rectified at a rectifier wherefrom rated direct current is delivered to stimulate respective magnetic coils on the second stator of a braking device enclosing the dynamo; the second stator clamping internally a second rotor of a metal checked heat diffusion ring so that once the second rotor turns in rotation and respective magnetic coil on the second stator are stimulated, the interrelated movement occasioned thereby will induce a vortex upon the second rotor, meantime produce a braking torque sufficient to rapid diffusion of magnetically induced heat as well as the braking heat. Magnitidue of the direct current outgoing from the rectifier maybe regulated by a pulse regulator.

5 Claims, 6 Drawing Sheets

AUTONOMOUS GENERATION BRAKE

BACKGROUND OF THE INVENTION (a) Field of the Invention

Autonomous Generation Brake, in particular such an autonomous generation Brake which is fit for assemblage to a sports bike or any of a variety of sports machines.

(b) Description of the Prior Art

On a sports bike which is typically meant for fixed point pedalling practice, it is necessary to mount an impediment device, or one known in the name of a braking device, to simulate the resistance prevailing in the case of a regular bicycle being ridden for transport. A typical braking device integral with a sports bike, such as the one shown in FIG. 1, and FIG. 2 respectively comprises a magnetic metal stator (1) and a magnetic metal rotor (2), both being concentric with each other, with rotor (2) being stably mounted onto the follower shaft (21) that penetrates into the mandrel, enclosing the stator (l), the rotor (2) incorporates a cast iron disk (22) and a permanent magnet ring (23) clung inside (221) said disk (22); said follower shaft (2l) being transmitted by a conveyor (3) which can be, for instance, a belt or a chain. Referring to FIG. 3 it will be seen that afore-mentioned stator (1), for example an annular cast iron piece, in addition to being separate from rotor (2) by a clearance (dl), is furnished on its perimeter with armature coil (11) per pole, held apart by 2 or 3 equidistant clearances (d2), in order that once rotor (2) starts rotation, the permanent magnet in the form of a solenoid (23) that is clamped inside (221) the disk (22) will become magnetized to produce Alternate Current (=AC) (I), in the meantime, interrelated movement between each armature coil (11) and solenoid (23) the permanent magnet serves to induce current in armature coil (ll), which current interacts with solenoid (23) to produce braking effect (impedance or resistance).

Still, in a braking device the element emitting heat is basically the armature coil (11) which must be insulated, the in sulator is invariably impervious to heat transmission, that is, materials used as insulator can hardly withstand higher temperature, too high a temperature will doubtless defeat insulation materials, so heat diffusion in this connection is very much a problem, and heat diffusion in this instance must be carried out by other heat diffusion means; also, since in this connection the main braking power, speaking of a sports bike, must be rated at several hundred watts to realize sufficient braking momentum, to adjust braking torque, this power rating of several hundred watts must be duly controlled, in addition, with a greater power control circuit heating and heat diffusion can also prove to be a real hard-to-tackle problem. For improvement in view of the foregoing, efforts shed phrased in text follow below.

SUMMARY OF THE INVENTION

A principal object of the present invention is to provide an autonomous generation braking device meant for installation unto a sports bike or sports machine, and comprises generally an enclosed generator and a peripheral braking device enclosing an excitation solenoid to be supplied with rectified alternate current that is produced following transmissive rotation of said enclosed generator.

A further object of the present invention is to provide an autonomous generation braking device, comprising an enclosed second stator onto which are installed an even number of magnetizing coils; a second rotor on the peripheral side which incorporates a magnetically impervious high heat conductive matel braking ring interiorly to upgrade braking action on the vortex flow due to magnetic fields, and also serving to fast dissipate the generator-stimulated heat power as well as the braking heat power source to the braking device.

Still another object of the present invention is to provide an autonomous generation braking device wherein the direct current (=DC) fed to stimulate the even number of magnetizing coil sets relative to the second stator may be regulated by an externally installed Pulse Regulator.

An autonomous generation braking device meant to encompass all of the afore-mentioned objects comprises a dynamo whereby a first rotor on the discoid magnet in the core, once driven to rotation, what follows in suit is that the armature coil interwoven with an even number of poles inside the first state on the perimeter will get magnetized and induce forthwith an AC electro-motive potential, rectified by way of a rectifier, and the output in DC, serving to stimulate respective magnetic coils on the second stator of a braking device enclosing the dynamo; said second stator is further enclosed in a second rotor on a metal braking ring that is clamped internally, so that once the second rotor runs in rotation and all the stimulation coils on the second stator get magnetized, the interrelated movement amongst themselves will induce vortex flow on the second rotor and thereby produce a braking torque, meantime rapidly diffusing magnetization-induced heat power and braking heat power. Magnitude of the output of the DC current outgoing from the Rectifier may be adjusted by a Pulse Regulator.

DETAILED DESCRIPTION OF THE PREFERRED EMBODIMENT

Figure 1:
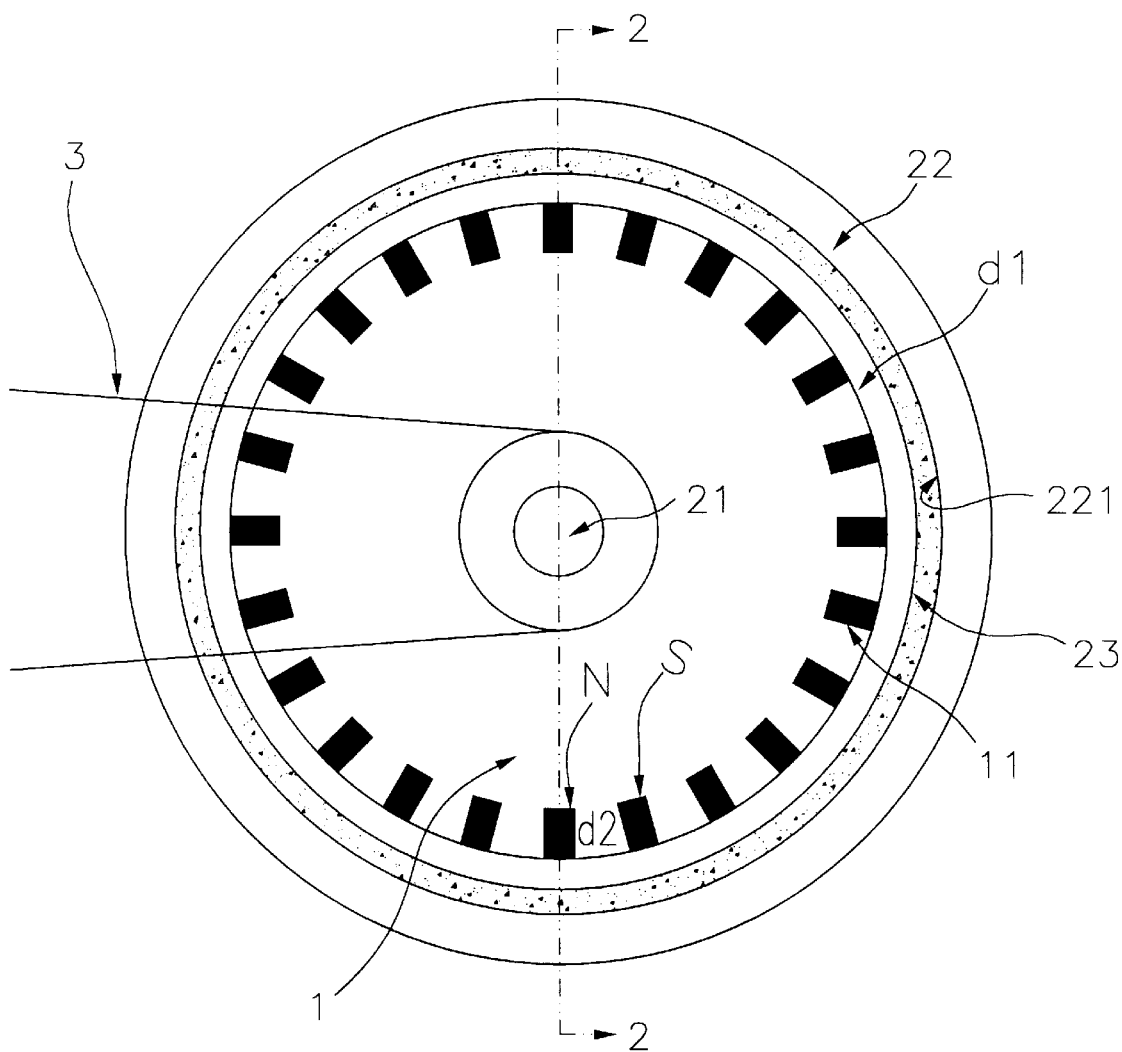
FIG. 1 is a top view of the conventional execution of a magnetic impedance installed onto a sports bike.
Figure 2:
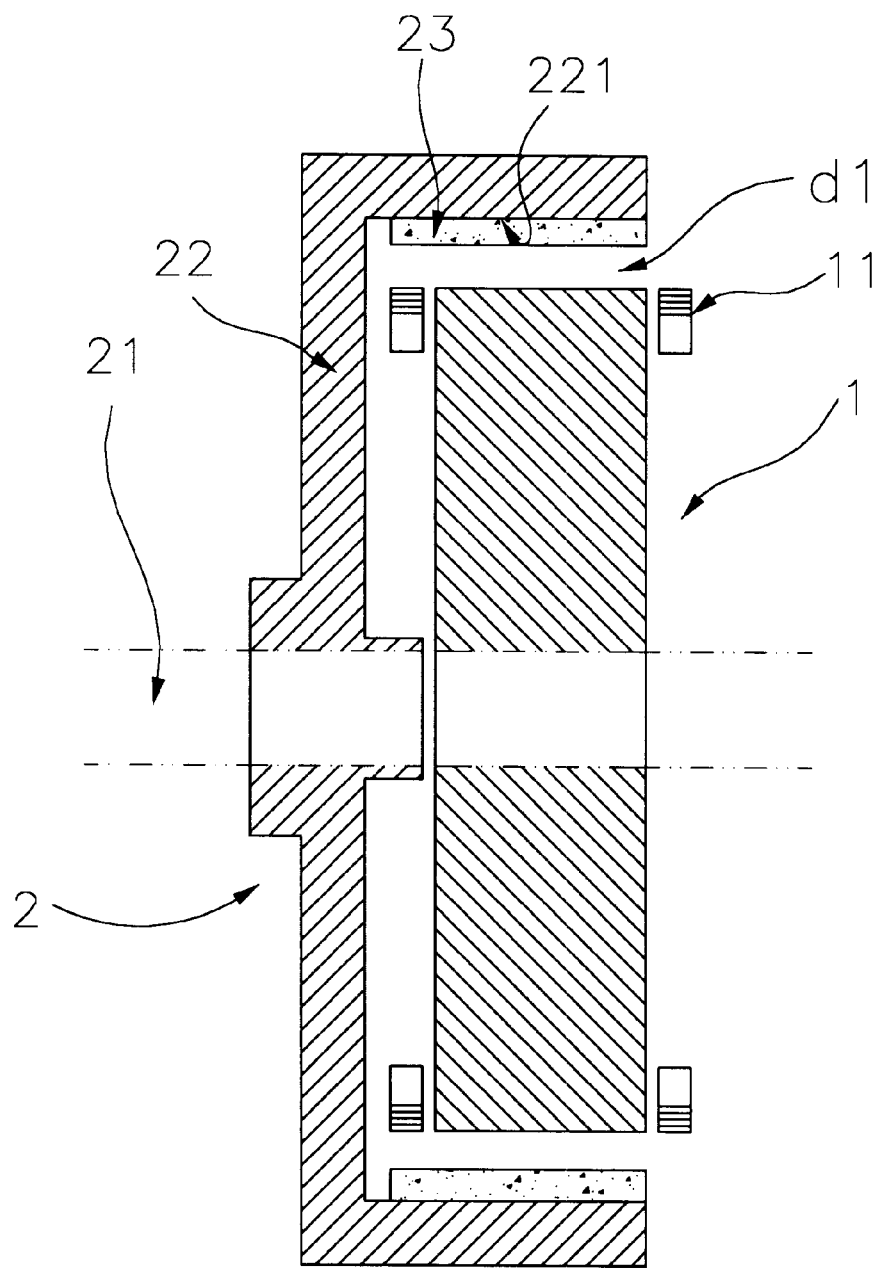
FIG. 2 is a section view taken along segment 2—2 of FIG. 1.
Figure 3:
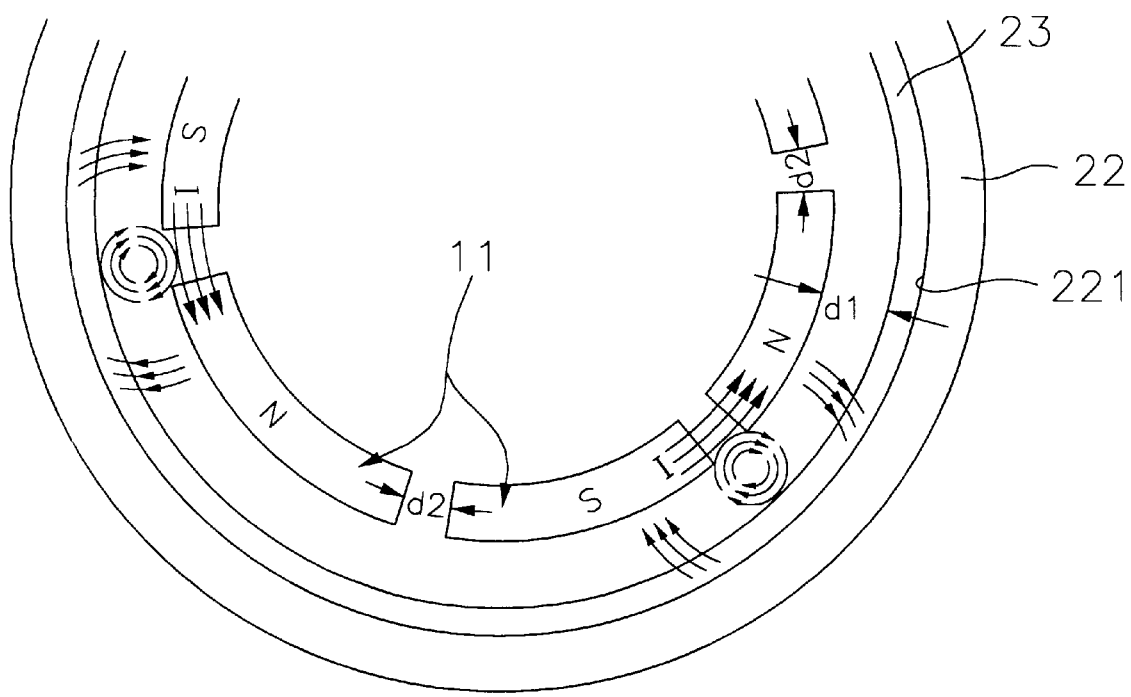
FIG. 3 is a field-induced vortex flow produced by a permanently magnetized solenoid wound by armature coil of a different polarity driven to rotation, on a partially enlarged scale.
Figure 4:
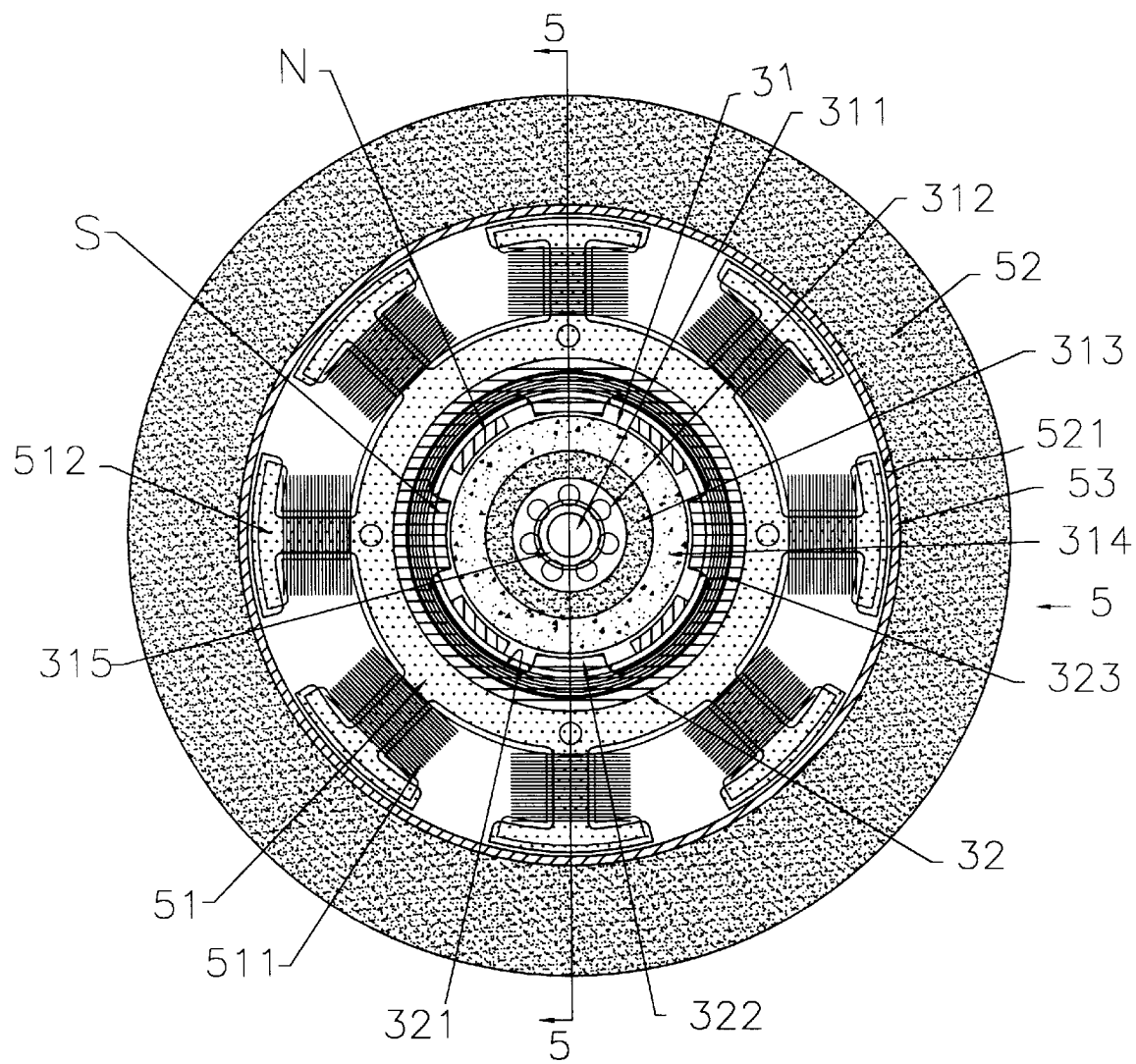
FIG. 4 is a top view of the invention autonomous generation braking device installed for execution.
Figure 5:
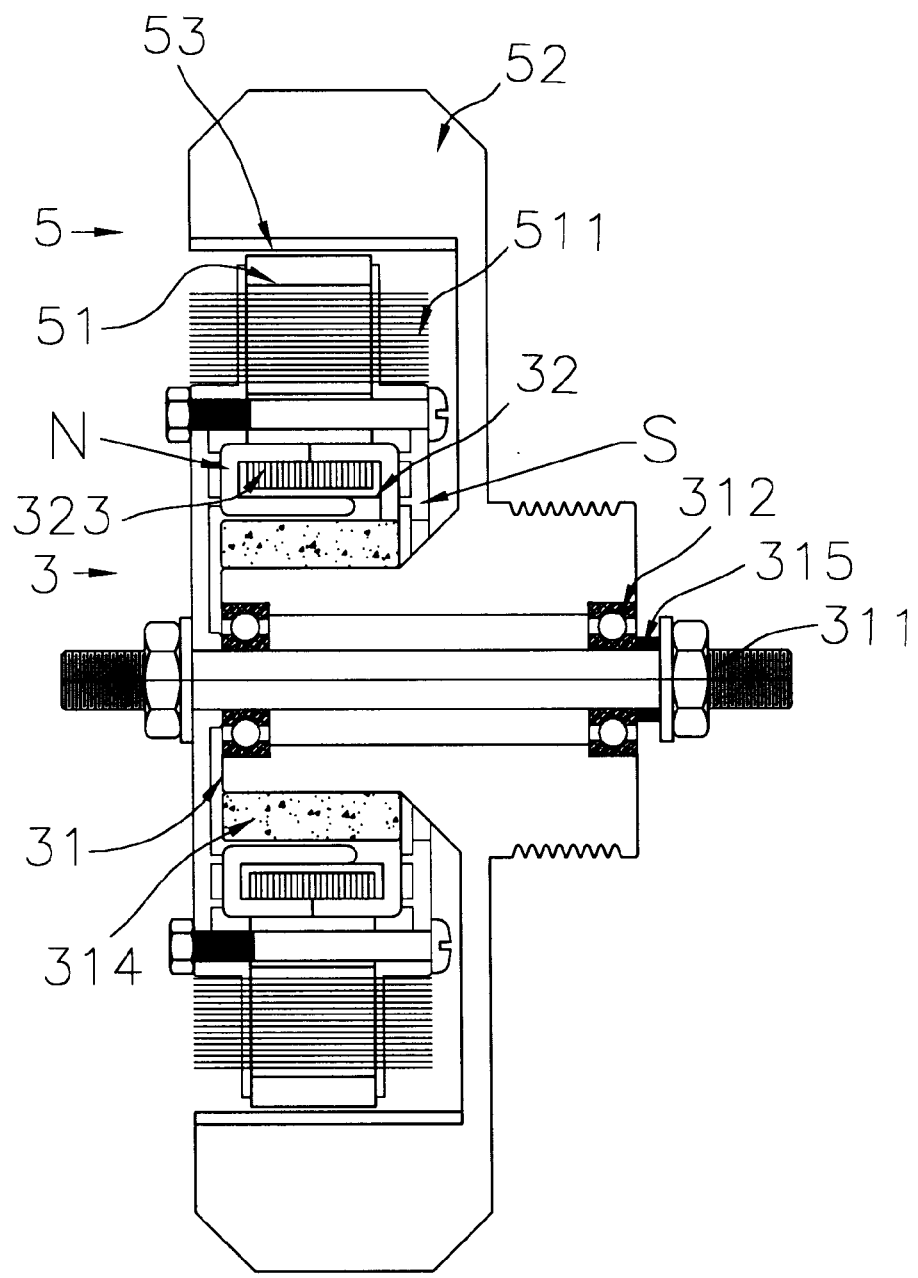
FIG. 5 is a section taken along segment 5—5 of FIG. 4.
Figure 6:
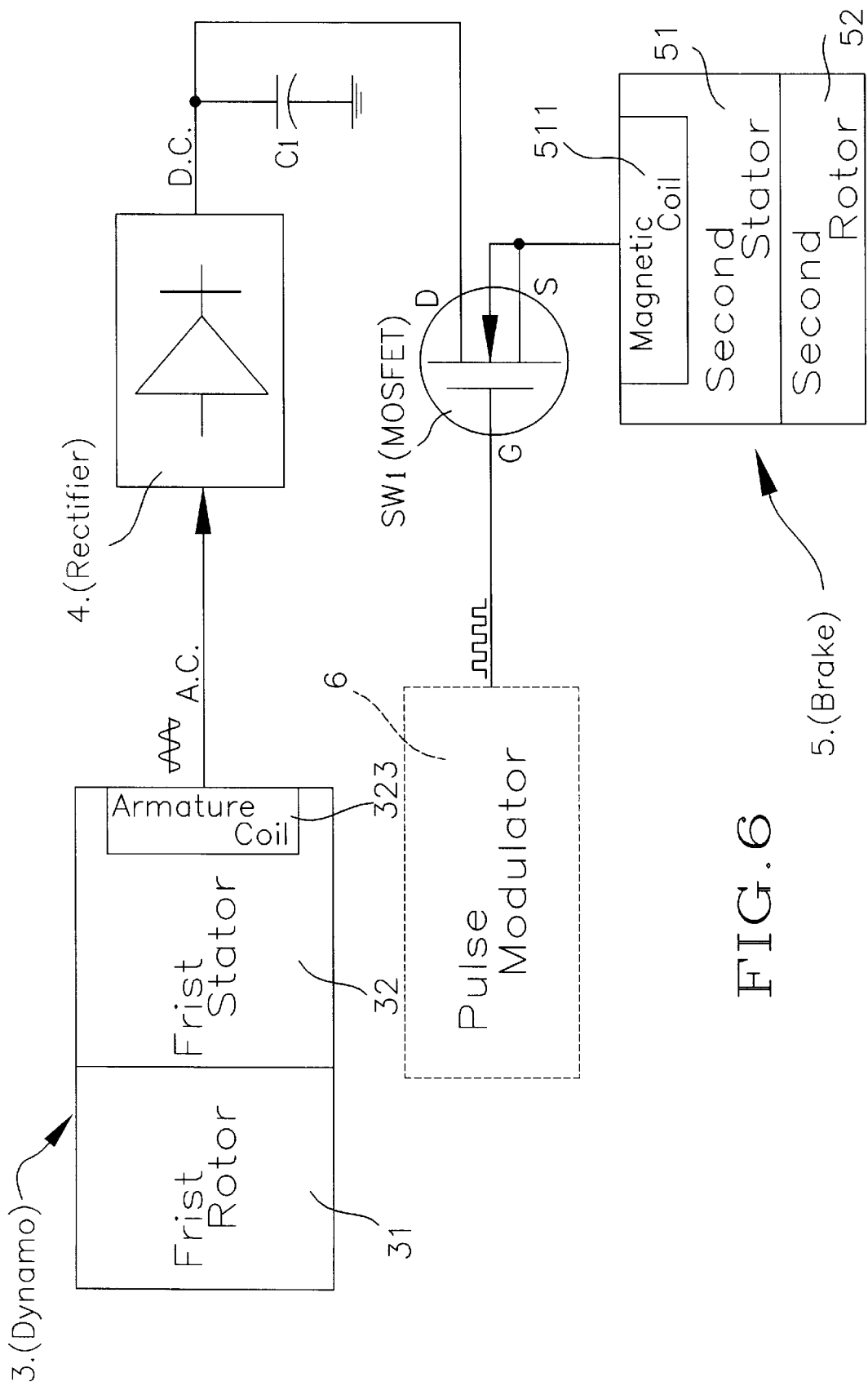
FIG. 6 is a working illustration of the installation according 5 to FIG. 4, whereof it is seen that the enclosed dynamo, once magnetized to generation, will produce AC current which is to be rectified through a rectifier to become DC current serving to stimulate each magnetic coil on the second stator of the peripheral braking device that is illustrated in FIG. 4 homogeneously.

A preferred embodiment of the invention Autonomous Generation Brake is illustrated in FIG. 4 through FIG. 6, comprising essentially a dynamo (3), a rectifier (4) and a brake (5). The dynamo (3) incorporates a solenoidal first rotor (31) composed of a permanent magnet, and a first stator (32) enclosing the first rotor (32). Inside (321) the first stator (32) there are furnished, protruding, an even number, for instance, 4 similarly configured interior stator (322) each of equal arc lengths so as to facilitate close enclosing of the first rotor (31), and to accommodate alternating layout of opposite N, S polarities to armature coil (323) windings, such that when the first rotor (31) rotates, the N, S pole armature coil (323), duly stimulated by the first rotor (31) that is essentially a permanent magnet, and the interrelated movement thereby caused prevailing between both parts, are sufficient to produce alternate current (AC) in the armature coil (323). Alternate current (AC) thus produced is rectified by a rectifier (4) wherefrom direct current (DC) flows as output to stimulate an even number of magnetic coil (511) on the second stator (51) of the brake (5) associated with and enclosing the dynamo (3), said even number of magnetic coil (511), 8 in total, for example, resembling the letter T in shape and protruded from the outside of the second stator (51) are made from yoke iron. The second stator (51) is enclosed by a second rotor (52) incorporating internally (521) a magnetically impervious, but highly thermal-conductive, metal base braking hoop (53), made of copper, for example, or aluminum, when the second rotor (52) rotates and each magnetizing coil (511) on the second stator (51) is stimulated, the metal base braking hoop (53), owing to the flux lines produced from intersection with each magnetizing coil (511), will induce vortex flow, thereby occasioning a good restraining effect between both parts. Heat due to magnetic stimulation and heat due to the braking action, by way of the fissure way between the metal base braking hoop (53) and the second stator (51), what with the high heat conduction feature on the part of metal base braking hoop (53) and rotation of the second rotor (52) that is made of cast iron and discoid in shape, are diffused rapidly.

To the output end of said rectifier (4) there is connected in parallel a capacitor (C1) to filter out unwanted signals and to stabilize the output direct current (DC), which is to be fed to the drain (D) of a Metal Oxide Semiconductor Field Effect Transistor (MOSFET) that functions as a switch (SW1), before said direct current (DC) is applied to stimulate all of the afore-mentioned magnetic coil (511), so that an outer pulse regulator (6) may proceed with wave amplitude as well as frequency modulation at the Gate (G) of said switch (SW1) which can be, for example, a MOSFET, so that the plurality of magnetic coils (511) in series connection with the loading end of said switch (SW1), for example, with the Source (S) of a MOSFET embodied as such, may meet required differential so that each magnetic coil (511) on the second stator (51) of the brake (5) may acquire an optimum stimulation facilitating the production of preferred vortical torque as well as braking effects. The afore-mentioned rotor (31) is composed of a mandrel (311), a bearing (312) enclosing said mandrel (311) for follow-up rotation, a hoop (313) made of cast iron and enclosing in turn the said bearing (312), plus a permanent magnet based hoop (314) enclosing said cast iron hoop (313), theperimeter of said mandrel (311) is sleeved with a bushing (315).

Being stimulated by a permanent magnet base hoop (314), the dynamo (3) under the invention is relieved of all other stimulation means; also the provision for the permanent magnet based hoop (314) to be installed in the first rotor (31) while the armature coil (323) is installed in the first stator (32) relieves the need to use rolling hoop and brush for rolling contact, whereby defect due to poor contact is precluded; also, since that the armature coil (323) of the dynamo (3) is wound of a single coil, what with the unique outstanding execution of the first stator (32) comprising yoke iron, simplification of the structure of this armature coil (323) is realized.

Although certain preferred embodiment of the present invention has been shown and described in detail, it should be understood that various changes and modification may be made therein without departing from the scope of the appended claims.

What is claimed is:

1. An autonomous generation brake, comprising:
   a dynamo, an annular first rotor made of a permanent magnet, a first stator enclosing said first rotor, an interior of said first stator being extended to be furnished with an even number of stator bordering an interior of said first rotor, meant for winding of an armature coil so as to form an alternating N, S polarity active layout, so that, when said first rotor rotates, the armature coil of N, S polarity wind onto afore-mentioned even number of interior stator will induce an AC potential as a result of cross-intersection of flux passage;
   a rectifier whereby rectification occurs on the AC potential prevailing on said dynamo so that a rated output of DC is delivered; and,
   a braking device comprising a second stator enclosing said dynamo and a second rotor enclosing said second stator, whereof from an outer side of said second stator there extends an even number of external stator to facilitate winding of magnetic coils each being stimulated by the DC outgoing from the afore-mentioned rectifier; also, inside the afore-mentioned rotor there is clamped in position a magnetically impervious, but highly heat conductive metal ring which in response to rotatin on the part of the said second rotor will engage in motion relative to fields activated by respective magnetic coils, and in consequence of that, induce vortex flow which further induce a braking torque to result in forcible, rapid diffusion of magnetically induced heat and brakiag heat as well.

2. An autonomous generation brake according to claim 1, whereof said metal braking ring is executed to be an aluminum ring.

3. An autonomous generation brake according to claim 1, whereof said metal braking ring is executed to be a copper ring.

4. An autonomous generation brake according to claim 1, whereof said stator inside said first stator forming part of said dynamo is of a protrusive yoke iron structure.

5. An autonomous generation brake according to claim 1, whereof said stator outside said second stator forming part of said dynamo is executed to be of a T shape yoke iron structure.

\* \* \* \* \*